(12) United States Patent
Choi et al.

(10) Patent No.: US 9,146,534 B2
(45) Date of Patent: Sep. 29, 2015

(54) 3-DIMENSIONAL HOLOGRAPHIC IMAGE DISPLAYING APPARATUS

(71) Applicant: SAMSUNG ELECTRONICS CO., LTD., Suwon-si (KR)

(72) Inventors: Kyu-hwan Choi, Yongin-si (KR); Dong-kyung Nam, Yongin-si (KR); Seung-hoon Han, Seoul (KR); Jung-mok Bae, Seoul (KR); Hoon Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 13/632,503

(22) Filed: Oct. 1, 2012

(65) Prior Publication Data

US 2013/0100513 A1 Apr. 25, 2013

(30) Foreign Application Priority Data

Oct. 24, 2011 (KR) .......................... 10-2011-0108805

(51) Int. Cl.
*G03H 1/26* (2006.01)
*G03H 1/00* (2006.01)
*G03H 1/02* (2006.01)
(Continued)

(52) U.S. Cl.
CPC ............ *G03H 1/0244* (2013.01); *G02B 6/0038* (2013.01); *G03H 1/2286* (2013.01); *G03H 1/24* (2013.01); *G03H 2001/2226* (2013.01); *G03H 2001/2263* (2013.01); *G03H 2210/30* (2013.01); *G03H 2223/16* (2013.01); *G03H 2250/42* (2013.01)

(58) Field of Classification Search
None
See application file for complete search history.

(56) References Cited

U.S. PATENT DOCUMENTS

| 6,760,135 | B1 | 7/2004 | Payne et al. |
| 7,813,016 | B2 | 10/2010 | Pu et al. |
| 2009/0190373 | A1* | 7/2009 | Bita et al. ...................... 362/620 |

FOREIGN PATENT DOCUMENTS

| JP | 2001-356703 A | 12/2001 |
| KR | 10-2004-0090667 A | 10/2004 |

(Continued)

OTHER PUBLICATIONS

Maruo et al. "Evanescent-Wave Holography by Use of Surface-Plasmon Resonance," Apr. 10, 1997, Applied Optics, vol. 36, No. 11, pp. 2343-2346.*

(Continued)

*Primary Examiner* — Jade R Chwasz
(74) *Attorney, Agent, or Firm* — NSIP Law

(57) ABSTRACT

A 3-dimensional (3D) holographic image displaying apparatus is provided. The apparatus includes a hologram reproducer configured to generate surface plasmons in response to incident light and reproduce a 3D image by diffracting the generated surface plasmons by a hologram, and a surface light source unit including a light source and a light guide plate, the light guide plate being configured to allow incident light from the light source to enter into the light guide plate, internally reflect the allowed light, and output the internally reflected light through a light-output surface, the surface light source unit being configured to implement colors by adjusting an angle of the light incident to the hologram reproducer so that the outputted light through the light-output surface is incident to the hologram reproducer at a surface plasmon-forming angle for each wavelength to generate the surface plasmons corresponding to a plurality of color beams.

19 Claims, 4 Drawing Sheets

(51) Int. Cl.
*G03H 1/22* (2006.01)
*G03H 1/24* (2006.01)
*F21V 8/00* (2006.01)

(56) References Cited

FOREIGN PATENT DOCUMENTS

KR  10-2006-0128587 A  12/2006
WO  WO 2010/002701 A1  1/2010

OTHER PUBLICATIONS

Ozaki, Miyu et al. "Surface-Plasmon Holography with White-Light Illumination." *Science* 332 (Apr. 8, 2011): pp. 218-220.
Ozaki, Miyu, Jun-ichi Kato, and Satoshi Kawata. "Supporting Online Material for Surface-Plasmon Holography with White-Light Illumination." *Science* 332 (Apr. 8, 2011): 4 pages.

* cited by examiner

3-DIMENSIONAL HOLOGRAPHIC IMAGE DISPLAYING APPARATUS

CROSS-REFERENCE TO RELATED APPLICATIONS

This application claims the benefit under 35 U.S.C. §119(a) of Korean Patent Application No. 10-2011-0108805, filed on Oct. 24, 2011, in the Korean Intellectual Property Office, the entire disclosure of which is incorporated herein by reference for all purposes.

BACKGROUND

1. Field

The following description relates to apparatuses to display a 3-dimensional (3D) holographic image based on surface plasmons.

2. Description of Related Art 3-dimensional (3D) image display apparatuses are in demand in various fields, such as medical imaging, games, advertisement, education, the military, and various other industries known to those of ordinary skill in art, based on their capability to represent relatively more realistic and effective images than 2D image display apparatuses. Accordingly, research has been performed to develop a holography or stereoscopy method to implement a 3D image.

The holography method, which is based on the principle of recording an interference signal obtained by overlapping light from a subject with interferential reference light and reproducing the interference signal, is an ideal display method to implement images having a cubic effect. Research into holography has been performed by a number of scientists since holography was proposed by Dennis Gabor, a British scientist, in the 1940s.

Various techniques related to holography have been developed, such as a pulse hologram technique to capture a moving picture, a stereo hologram technique to display a broad area scene and make a broad visual field angle possible, an emboss hologram technique to make mass-production possible, a natural color hologram technique to display natural colors, a digital holography technique based on a digital image pickup device, and an electronic holography technique to display electronic holograms.

Electronic holography, which has been commonly used since 1990, is a field for researching methods that use holography as next-generation image technology. Electronic holography is based on a method of creating a hologram by scanning and transmitting an image captured from an original subject on a pixel basis, sampling and transmitting data included in the hologram, and reproducing the original subject on a display device by restoring the hologram from the data.

Since too much data is included in a hologram for practical sampling and transmission, research is being performed regarding the creation of a hologram by a computer and the subsequent electro-optic display of the hologram. In addition, various hologram systems have been researched to overcome hologram device limitations.

SUMMARY

In one general aspect, a 3-dimensional (3D) image displaying apparatus includes a hologram reproducer configured to generate surface plasmons in response to incident light and reproduce a 3D image by diffracting the generated surface plasmons by a hologram, and a surface light source unit including a light source and a light guide plate, the light guide plate being configured to allow incident light from the light source to enter into the light guide plate, internally reflect the allowed light, and output the internally reflected light through a light-output surface, the surface light source unit being configured to implement colors by adjusting an angle of the light incident to the hologram reproducer so that the outputted light through the light-output surface is incident to the hologram reproducer at a surface plasmon-forming angle for each wavelength to generate the surface plasmons corresponding to a plurality of color beams.

The apparatus may include that the light guide plate further includes a first transparent area and a second transparent area, the second transparent area including a refractive index different from a refractive index of the first transparent area, the second transparent area being inserted into the first transparent area and having a cross-sectional shape of a triangle.

The apparatus may include that the second transparent area further includes a first surface on which light incident from the first transparent area is refracted and a second surface configured to reflect light incident through the first surface by forming an angle with the first surface to output the reflected light through the light-output surface, on a boundary with the first transparent area.

The apparatus may include that the incident light is totally reflected on the second surface and output through the light-output surface.

The apparatus may include that the second transparent area has a refractive index that is greater than a refractive index of the first transparent area.

The apparatus may include that the angle of the light incident to the hologram reproducer is changed by changing an angle of the light incident to the light guide plate by adjusting the light source.

The apparatus may include that one or more selected from the group consisting of the first transparent area and the second transparent area includes a transparent polymer.

The apparatus may include that the second transparent area is one of a plurality of second transparent areas, and the angle of the light incident to the hologram reproducer is changed by changing an angle formed by the first and second surfaces according to a physical magnitude change of each of the second transparent areas.

The apparatus may include that the light guide plate changes an angle formed by the first and second surfaces according to a physical magnitude change of each of the second transparent areas by including an electro-wetting element.

The apparatus may include that the light guide plate is a wedge-type light guide plate and changes the angle of the light incident to the hologram reproducer by changing an angle of the light incident to the light guide plate by adjusting the light source.

The apparatus may include that the hologram reproducer includes a hologram and a metal film layered on the hologram to generate the surface plasmons.

The apparatus may include that the hologram includes a photoresist hologram.

The apparatus may include that the metal film is coated on the hologram.

In another general aspect, an image displaying apparatus includes a light guide plate including a first transparent area and a second transparent area, the second transparent area including a first surface, a second surface, and a refractive index that is greater than a refractive index of the first transparent area, the light guide plate being configured to allow incident light to enter into the first transparent area, the first transparent area being configured to internally reflect the allowed light, the first surface being configured to refract the internally reflected light from the first transparent area into the second transparent area, the second surface being configured to reflect the refracted light to output the reflected light via a light-output surface, a hologram on the light guide plate, and a metal film on the hologram, the metal film being configured to generate surface plasmons for color beams according to angles of the outputted light that are incident to the metal film at surface plasmon-forming angles, the angles being formed by the first surface and the second surface.

Other features and aspects may be apparent from the following detailed description, the drawings, and the claims.

Figure 1:
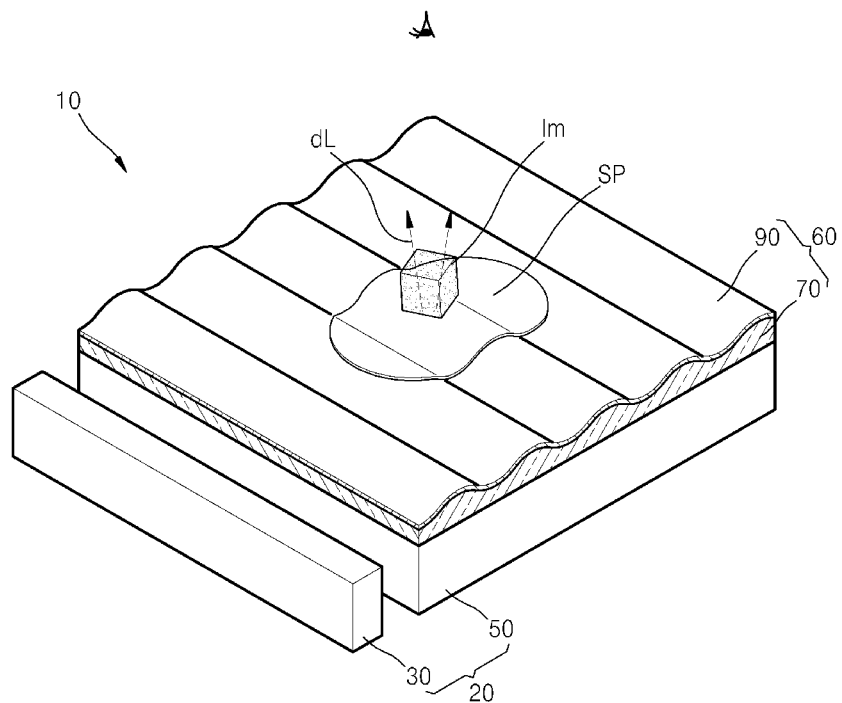
FIG. 1 is a diagram illustrating an example of a prospective view of a 3D holographic image displaying apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

A surface plasmon is a kind of wave energy flowing along a surface by electromagnetic field fluctuation of light that is well matched to a density distribution change of metal surface electrons. According to a skin depth characteristic of a metal, electrons within tens of nanometers of depth from the surface may fluctuate in response to fluctuation of an electric field of light incident from the outside due to an effect of the electric field. Under a boundary condition satisfying Maxwell's electromagnetic equations, an incident angle of light causing the fluctuation of electrons varies according to the wavelength (i.e., frequency) of the light. That is, there is wavelength (or angle) selectivity in the surface plasmon.

Therefore, wavelengths of plasmons generated for wavelengths (frequencies) are also uniquely defined, meaning that incident angles of light to generate the plasmons vary.

In an example, a 3D holographic image displaying apparatus includes a surface light source unit capable of performing spatial angle change and modulation of output light to effectively implement the nature of a surface plasmon and wavelength selectivity, thereby enabling the performance of full-color holography reproduction by the 3D holographic image displaying apparatus. As described above, in an example, a 3D holographic image displaying apparatus effectively implements wavelength selectivity of a light source for reproduction and reduces a size of a spatial volume of a holography system by using the surface light source unit that is capable of performing spatial angle change and modulation of output light.

Figure 2:
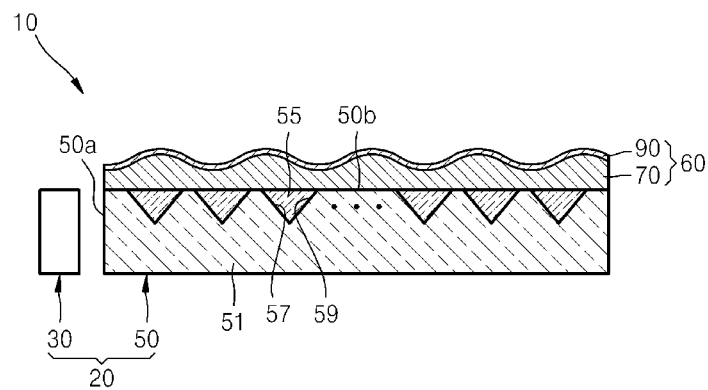
FIG. 2 is a diagram illustrating an example of a cross-sectional view of the apparatus of FIG. 1.

FIG. 1 is a diagram illustrating an example of a prospective view of a 3D holographic image displaying apparatus 10. FIG. 2 is a diagram illustrating an example of a cross-sectional view of the apparatus 10 of FIG. 1.

Referring to the example illustrated in FIGS. 1 and 2, the apparatus 10 includes a hologram reproducer 60 and a surface light source unit 20. The hologram reproducer 60 includes a hologram 70 and a metal film 90 layered on the hologram 70 to generate surface plasmons in response to light incident at surface plasmon-forming angles for color beams (wavelengths). The surface light source unit 20 includes a light source 30 and a light guide plate 50. The light guide plate 50 allows, through a light-input surface 50a of the light guide plate 50, incident light from the light source 30 to enter into the light guide plate 50 by internal total reflection and outputs the reflected light through the light-output surface 50b. In an example of the apparatus 10, the surface light source unit 20 implements colors by adjusting an angle of the light incident to the hologram reproducer 60 so that the outputted light through the light-output surface 50b is incident to the hologram reproducer 60 at a surface plasmon-forming angle for wavelengths to generate the surface plasmons corresponding to a plurality of color beams.

In an example, the hologram 70 in the hologram reproducer 60 is formed as a thin layer to record a 3D image to be displayed, e.g., a full-color 3D image, in a shape of the hologram 70. In another example, the hologram 70 is a photoresist hologram formed based on a photoresist.

In an example, the metal film 90 in the hologram reproducer 60 is coated on the hologram 70. When a beam corresponding to a color image desired to be displayed is incident from the surface light source unit 20 to the metal film 90 at a surface plasmon-forming angle capable of surface plasmon generation for the color beam, a surface plasmon SP is generated on an interface between the metal film 90 and a dielectric layer. In this example, the generated surface plasmon SP is wave-guided in a direction parallel to a plane and diffracted by the hologram 70 to generate a diffracted beam dL. Further, the diffracted beam dL travels in a vertical direction to reproduce a 3D image Im. For example, when a red beam, a green beam, and a blue beam are incident to the hologram 70 at respective surface plasmon-forming angles, red, green, and blue diffracted beams are generated and travel in the vertical direction to reproduce a full-color 3D image. In an example, the dielectric layer is formed as a thin layer with a dielectric material between the metal film 90 and the hologram 70. In another example, when the hologram 70 is formed of a dielectric material, the hologram 70 functions as the dielectric layer.

In an example, the light source 30 in the surface light source unit 20 includes a white light source to output white light. In another example, the light source 30 includes a combination of a plurality of light sources to output a plurality of color beams, e.g., a red beam, a green beam, and a blue beam, to perform color implementation. In the example illustrated in FIGS. 1 and 2, the light source 30 is at one side of the light guide plate 50. The light source is adjustable to change an angle of light incident to the light guide plate 50 as described later.

The light guide plate 50 in the surface light source unit 20 includes the light-input surface 50a, into which light output from the light source 30 is incident, and the light-output surface 50b, from which light traveling by internal total reflection is output. In an example, the light guide plate 50 includes a first transparent area 51 and a plurality of second transparent areas 55, each having a refractive index different from that of the first transparent area 51. In the example illustrated in FIG. 2, each of the second transparent areas 55 are inserted into the first transparent area 51 and have a cross-sectional shape of a triangle.

Figure 3:
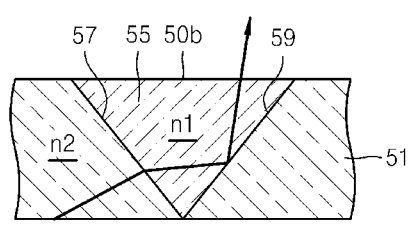
FIG. 3 is a diagram illustrating an example of a magnified view of a portion of a light guide plate that illustrates a path of light incident into a second transparent area.

FIG. 3 is a diagram illustrating an example of a magnified view of a portion of a light guide plate 50 that illustrates a path of light incident to a second transparent area 55. Referring to the example illustrated in FIG. 3, the second transparent area 55 illustrated includes a first surface 57 on which light incident from the first transparent area 51 is refracted and a second surface 59 that reflects light incident to the second transparent area 55 through the first surface 57 by forming an angle with the first surface 57 to output the reflected light through the light-output surface 50b, on a boundary with the first transparent area 51. Based on a side along which light incident to the first transparent area 51 of the light guide plate 50 from the light source 30 travels, the first surface 57 corresponds to a refraction surface and the second surface 59 corresponds to a reflection surface. In an example, the light incident to the second transparent area 55 is totally reflected on the second surface 59 and output through the light-output surface 50b. To achieve this internal total reflection, the second transparent area 55 is formed of a material having a refractive index that is greater than a refractive index of a material forming the first transparent area 51. As shown in the example illustrated in FIG. 3, assuming that the refractive index of the first transparent area 51 is n2 and the refractive index of the second transparent area 55 is n1, the first and second transparent areas 51 and 55 satisfy a condition of n1>n2.

As described above, under the boundary condition satisfying Maxwell's electromagnetic equations, an incident angle of light causing the fluctuation of electrons varies according to the wavelength of the light. That is, there is wavelength (or angle) selectivity in a surface plasmon, and there is an incident angle of light that forms a surface plasmon for each color beam (wavelength). A surface plasmon-forming angle for each color beam (wavelength) indicates an incident angle of light that forms a surface plasmon for each color beam (wavelength).

Thus, in an example, since a surface plasmon is generated in response to a predetermined color beam only if light is incident at an incident angle satisfying a surface plasmon-forming condition of the predetermined color beam, when a red beam R, a green beam G, and a blue beam B are incident to the metal film 90 in the hologram reproducer 60 at different angles satisfying respective surface plasmon-forming conditions, surface plasmons of the red beam R, the green beam G, and the blue beam B are generated.

Accordingly, as described further below, in an example, the surface light source unit 20 implements colors by adjusting an angle of light incident to the hologram reproducer 60 so that the light output through the light-output surface 50b of the light guide plate 50 or a combination of the light guide plate 50 and the light source 30 is incident to the hologram reproducer 60 at surface plasmon-forming angles for a plurality of color beams to generate surface plasmons for the plurality of color beams.

Figure 4:
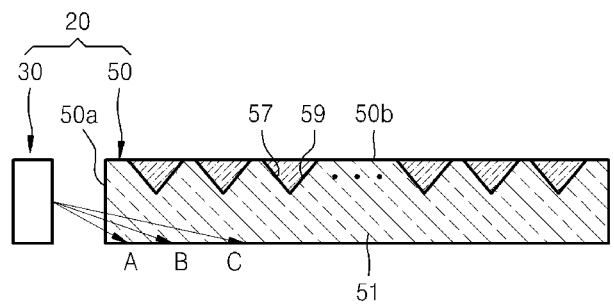
FIG. 4 is a diagram illustrating an example of adjusting an incident angle of light incident into the light guide plate by adjusting a light source.

FIG. 4 is a diagram illustrating an example of adjusting an incident angle of light incident to the light guide plate 50 by adjusting a light source 30. As shown in the example illustrated in FIG. 4, by adjusting an incident angle of light incident to the light guide plate 50 by adjusting the light source 30, light output from the surface light source unit 20 through the light-output surface 50b is incident to the hologram reproducer 60 at surface plasmon-forming angles for color beams. In FIGS. 4, A, B, and C denote, as an example, paths of light of which an incident angle is changed by adjusting the light source 30.

In this example, when the light source 30 is formed by a combination of a plurality of color light sources, for example, if the light source 30 is adjusted and controlled so that the red beam R, the green beam G, and the blue beam B are incident to the metal film 90 in the hologram reproducer 60 at red, green, and blue surface plasmon-forming angles, surface plasmons are generated in response to the red beam R, the green beam G, and the blue beam B. When the light source 30 is formed by a combination of a plurality of color light sources, surface plasmons for the color beams are generated in response to the red beam R, the green beam G, and the blue beam B while the light source 30 is being adjusted for one scan by controlling the plurality of color light sources to be turned on or only a color light source corresponding to each predetermined position to be turned on.

In a case where the light source 30 is formed by a white light source, since white light includes the red beam R, the green beam G, and the blue beam B, when the light source 30 is adjusted, a surface plasmon is generated in response to a predetermined color beam according to a surface plasmon-forming angle corresponding to the predetermined color beam of the white light output from the light source 30. As a result, surface plasmons for the red, green, and blue beams R, G, and B are respectively generated in response to the red, green, and blue beams R, G, and B while the light source 30 is being adjusted for one scan.

In an example, the light guide plate 50 in the surface light source unit 20 is formed to form a fixed or variable angle by the first and second surfaces 57 and 59. One or more selected from the group consisting of the first and second transparent areas 51 and 55 of the light guide plate 50 includes a transparent polymer. Further, the first and second transparent areas 51 and 55 are formed by transparent polymers having different refractive indexes. When one or more selected from the group consisting of the first and second transparent areas 51 and 55 is formed by a transparent polymer, an angle formed by the first and second surfaces 57 and 59 is fixed.

Figure 5A:
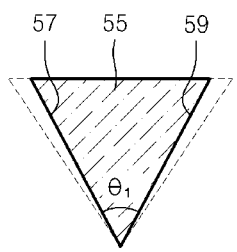
FIGS. 5A, 5B, and 5C are diagrams illustrating examples of changing an angle formed by a first surface and a second surface to $\theta_1$, $\theta_2$, and $\theta_3$ by a physical magnitude change of a second transparent area of the light guide plate.
Figure 5B:
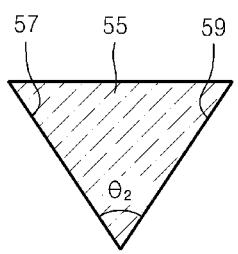
Figure 5C:
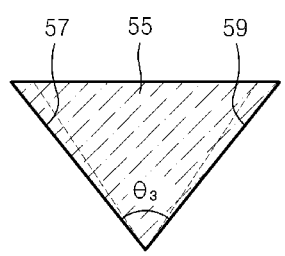

As another example, the light guide plate 50 is formed to change an angle of light incident to the hologram reproducer 60 by changing an angle formed by the first and second surfaces 57 and 59 according to a physical magnitude change of the second transparent area 55 (in this case, a physical magnitude of the first transparent area 51 is also changed vice versa), as shown in the examples illustrated in FIGS. 5A, 5B, and 5C. FIGS. 5A, 5B, and 5C are diagrams illustrating examples of changing an angle formed by a first surface 57 and a second surface 59 to $\theta_1$, $\theta_2$, and $\theta_3$ by a physical magnitude change of a second transparent area 55 of the light guide plate 50. For example, when the light guide plate 50 is formed by including an electro-wetting element, an angle formed by the first surface 57 and the second surface 59 is changed according to a physical magnitude change of the second transparent area 55.

As shown in the examples illustrated in FIGS. 5A, 5B, and 5C, when the light guide plate 50 is formed to change an angle of light incident to the hologram reproducer 60, by changing an angle formed by the first and second surfaces 57 and 59 according to a physical magnitude change of the second transparent area 55, colors are implemented by adjusting an angle of light incident to the hologram reproducer 60 by only a change of an angle formed by the first surface 57 and the second surface 59 with the light source 30 fixed so that the light output through the light-output surface 50b is incident to the hologram reproducer 60 at surface plasmon-forming angles for a plurality of color beams to generate surface plasmons for the plurality of color beams. An angle formed by the first surface 57 and the second surface 59 may be changed according to a physical magnitude change of the second transparent area 55 of the light guide plate 50 while the light source 30 is being adjusted.

Figure 6:
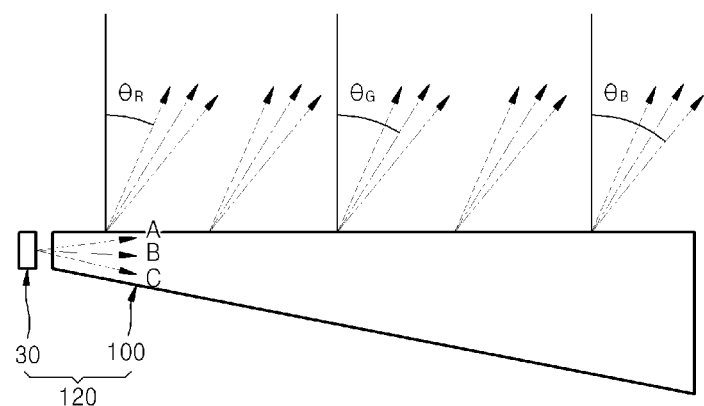
FIG. 6 is a diagram illustrating an example of a front view of another surface light source unit 120 that is applied to the 3D holographic image displaying apparatus.

FIG. 6 is a diagram illustrating an example of a front view of another surface light source unit 120 that is applied to the 3D holographic image displaying apparatus 10. As shown in the example illustrated in FIG. 6, the surface light source unit 120 includes a wedge-type light guide plate 100 instead of the flat-plate-type light guide plate 50 including the first and second transparent areas 51 and 55 described above and as shown in the examples illustrated in FIGS. 1, 2, and 4. Although FIG. 6 shows a case where the wedge-type light guide plate 100 is formed by a single material, this is only an example; the wedge-type light guide plate 100 may also be formed by including the first and second transparent areas 51 and 55, and a shape of the wedge-type light guide plate 100 may be variously modified.

In the example illustrated in FIGS. 6, A, B, and C denote paths of light incident to the wedge-type light guide plate 100 at various incident angles by adjusting the light source 30. $\theta_R$, $\theta_G$, $\theta_B$ denote surface plasmon-forming angles for red, green, and blue beams, respectively. When an incident angle of light incident to the wedge-type light guide plate 100 from the light source 30 is continuously changed, an incident angle of light output through the wedge-type light guide plate 100 and incident to the hologram reproducer 60 is continuously changed as well. Therefore, when the light is incident to the hologram reproducer 60 at an angle of $\theta_R$, a surface plasmon is generated by a red beam. When the light is incident to the hologram reproducer 60 at an angle of $\theta_G$, a surface plasmon is generated by a green beam. When the light is incident to the hologram reproducer 60 at an angle of $\theta_B$, a surface plasmon is generated by a blue beam.

Accordingly, even when the wedge-type light guide plate 100 is included in the surface light source unit 120, full-color surface plasmon holography reproduction may be performed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A 3-dimensional (3D) image displaying apparatus, comprising:
   a hologram reproducer configured to generate surface plasmons in response to incident light and to reproduce a 3D image by diffracting the generated surface plasmons by a hologram; and
   a surface light source unit comprising:
      a light source,
      a light guide plate being configured to allow incident light from the light source to enter into the light guide plate, to internally reflect the allowed light, and to output the internally reflected light through a light-output surface, and
      the surface light source unit being configured to implement colors by adjusting an angle of the light incident to the hologram reproducer so that the outputted light through the light-output surface is incident to the hologram reproducer at a surface plasmon-forming angle for each wavelength to generate the surface plasmons corresponding to a plurality of color beams,
      wherein the light guide plate further comprises a first transparent area and a second transparent area, the second transparent area comprising a refractive index different from a refractive index of the first transparent area, the second transparent area being inserted into the first transparent area and having a cross-sectional shape of a triangle.

2. The apparatus of claim 1, wherein the second transparent area further comprises a first surface on which light incident from the first transparent area is refracted and a second surface configured to reflect light incident through the first surface by forming an angle with the first surface to output the reflected light through the light-output surface, on a boundary with the first transparent area.

3. The apparatus of claim 2, wherein the incident light is totally reflected on the second surface and output through the light-output surface.

4. The apparatus of claim 3, wherein the second transparent area has a refractive index that is greater than a refractive index of the first transparent area.

5. The apparatus of claim 1, wherein the second transparent area has a refractive index that is greater than a refractive index of the first transparent area.

6. The apparatus of claim 1, wherein the angle of the light incident to the hologram reproducer is changed by changing an angle of the light incident to the light guide plate by adjusting the light source.

7. The apparatus of claim 6, wherein one or more selected from the group consisting of the first transparent area and the second transparent area comprises a transparent polymer.

8. The apparatus of claim 6, wherein the second transparent area is one of a plurality of second transparent areas, and
   wherein the angle of the light incident to the hologram reproducer is changed by changing an angle formed by the first and second surfaces according to a physical magnitude change of each of the second transparent areas.

9. The apparatus of claim 8, wherein the light guide plate changes an angle formed by the first and second surfaces according to a physical magnitude change of each of the second transparent areas by including an electro-wetting element.

10. The apparatus of claim 1, wherein the second transparent area is one of a plurality of second transparent areas, and
    wherein the angle of the light incident to the hologram reproducer is changed by changing an angle formed by the first and second surfaces according to a physical magnitude change of each of the second transparent areas.

11. The apparatus of claim 10, wherein the light guide plate changes an angle formed by the first and second surfaces according to a physical magnitude change of each of the second transparent areas by including an electro-wetting element.

12. The apparatus of claim 1, wherein the light guide plate is a wedge-type light guide plate and changes the angle of the light incident to the hologram reproducer by changing an angle of the light incident to the light guide plate by adjusting the light source.

13. The apparatus of claim 12, wherein the hologram reproducer comprises a hologram and a metal film layered on the hologram to generate the surface plasmons.

14. The apparatus of claim 13, wherein the hologram comprises a photoresist hologram.

15. The apparatus of claim 13, wherein the metal film is coated on the hologram.

16. The apparatus of claim 1, wherein the hologram reproducer comprises a hologram and a metal film layered on the hologram to generate the surface plasmons.

17. The apparatus of claim 16, wherein the hologram comprises a photoresist hologram.

18. The apparatus of claim 16, wherein the metal film is coated on the hologram.

19. An image displaying apparatus, comprising:
a light guide plate comprising a first transparent area and a second transparent area, the second transparent area comprising a first surface, a second surface, and a refractive index that is greater than a refractive index of the first transparent area, the light guide plate being configured to allow incident light to enter into the first transparent area, the first transparent area being configured to internally reflect the allowed light, the first surface being configured to refract the internally reflected light from the first transparent area into the second transparent area, the second surface being configured to reflect the refracted light to output the reflected light via a light-output surface;
a hologram on the light guide plate; and
a metal film on the hologram, the metal film being configured to generate surface plasmons for color beams according to angles of the outputted light that are incident to the metal film at surface plasmon-forming angles, the angles being formed by the first surface and the second surface.

\* \* \* \* \*